(12) United States Patent
Riggs-Zeigen

(10) Patent No.: US 9,424,348 B1
(45) Date of Patent: Aug. 23, 2016

(54) SENSOR-DRIVEN AUDIO PLAYBACK MODIFICATION

(71) Applicant: Rock My World, Inc., San Diego, CA (US)

(72) Inventor: Adam Riggs-Zeigen, San Diego, CA (US)

(73) Assignee: Rock My World, Inc., San Diego, CA (US)

( * ) Notice: Subject to any disclaimer, the term of this patent is extended or adjusted under 35 U.S.C. 154(b) by 56 days.

(21) Appl. No.: 14/273,495

(22) Filed: May 8, 2014

Related U.S. Application Data

(60) Provisional application No. 61/821,104, filed on May 8, 2013.

(51) Int. Cl.
*G06F 17/00* (2006.01)
*G06F 17/30* (2006.01)

(52) U.S. Cl.
CPC ...... *G06F 17/3074* (2013.01); *G10H 2220/321* (2013.01)

(58) Field of Classification Search
None
See application file for complete search history.

(56) References Cited

U.S. PATENT DOCUMENTS

| 4,164,732 | A | 8/1979 | Pischiera |
| 5,215,468 | A | 6/1993 | Lauffer et al. |
| 6,448,485 | B1 | 9/2002 | Barile |
| 6,716,139 | B1 | 4/2004 | Hosseinzadeh-Dolkhani et al. |
| 6,746,247 | B2 | 6/2004 | Barton |
| 7,825,319 | B2 | 11/2010 | Turner |
| 8,101,843 | B2 | 1/2012 | Turner |
| 2007/0074617 | A1* | 4/2007 | Vergo ............ G06F 17/30743 84/612 |
| 2008/0097633 | A1* | 4/2008 | Jochelson ............ G11B 27/105 700/94 |
| 2013/0228063 | A1 | 9/2013 | Turner |
| 2013/0228064 | A1 | 9/2013 | Turner |

FOREIGN PATENT DOCUMENTS

| JP | 2003-108154 A | 4/2003 |
| JP | 2004-113552 A | 4/2004 |

* cited by examiner

*Primary Examiner* — Fan Tsang
*Assistant Examiner* — David Siegel
(74) *Attorney, Agent, or Firm* — Mintz Levin Cohn Ferris Glovsky and Popeo, P.C.

(57) ABSTRACT

Sensor data generated by one or more sensors associated with a digital content playback device can be used to identify that a modification to a current audio content item being supplied to a user by the digital content playback device is indicated. The current audio content item can be modified accordingly. Methods, systems, articles of manufacture and the like are also described.

20 Claims, 4 Drawing Sheets

| SCALING FACTOR | THRESHOLD DISTANCE | MAXIMUM STEPS PER MINUTE |
|---|---|---|
| 1 | 0.62 | 3.0 |
| 2 | 0.66 | 3.1 |
| 3 (POCKET) | 0.70 | 3.3 |
| 4 | 0.74 | 3.5 |
| 5 (HAND) | 0.78 | 3.5 |
| 6 | 0.82 | 3.5 |
| 7 (ARMBAND) | 0.86 | 3.5 |
| 8 | 0.90 | 3.5 |
| 9 | 0.94 | 3.5 |
| 10 | 0.98 | 3.5 |

*FIG. 3*

SENSOR-DRIVEN AUDIO PLAYBACK MODIFICATION

CROSS-REFERENCE TO RELATED APPLICATION

The current application is claims priority under 35 U.S.C. §119(e) to U.S. provisional application No. 61/821,104 filed on May 8, 2013, the disclosure of which is incorporated herein by reference.

TECHNICAL FIELD

The subject matter described herein relates to playback of audio media with one or more modifications that can be prompted by data provided by one or more sensors.

BACKGROUND

Music can be an important part of an exercise or other physical activity routine for many people. For example, runners, weight lifters, participants in aerobic exercises, users of cardiovascular exercise machines (e.g. stair steppers, stationary bicycles, elliptical motion machines, and the like), etc. frequently listen to music while participating in such activities. Music can help alleviate boredom, and a particularly motivational or inspirational song or group of songs can be helpful in maintaining focus and improving performance. However, while a user can assemble a group of songs (also referred to as a playlist or "mix") using one or more sources such as a personal music collection, an online music streaming service, or the like, such playlists generally lack the ability to react to the specifics of the physical activities that the user is performing at any given time.

SUMMARY

To address the above-noted and possibly other deficiencies in currently available approaches, and also to provide one or more advantages including but not limited to those contemplated herein, implementations of the current subject matter can include features that incorporate use of input data from one or more sensors that measure one or more parameters representative of a current state of physical activity of a user to dynamically modify one or more aspects of playback of music or other audio content item to which the user is listening. Non-limiting examples of a system that can implement an implementation of the current subject matter include smart phones or other portable electronic devices that either include or receive data from (e.g. over wired or wireless communications links) one or more sensors, which can include but are not limited to, global positioning system (GPS) transceivers or other location determination devices, accelerometers, gyroscopes, compasses, heart-rate monitoring devices, calorie-consumption monitoring devices, or the like.

In one aspect of the current subject matter, a method includes receiving sensor data generated by one or more sensors, identifying that a modification to an audio content item being supplied to a user by a digital content playback device is indicated, and making the modification to the audio content item. The identifying includes applying an algorithm based on the sensor data.

In optional variations, one or more of the following features can be included in any feasible combination. The modification can include changing from the current audio content item to a different audio content item. The different audio content item can have a different intensity criteria than the current audio content item. The different intensity criteria can include at least one of a different beats per minute, a different intensity level, and a different motivational level. The modification can include continuing to play the current audio content item, and changing from a current beats per minute of the current audio content item to a different beats per minute by speeding up or slowing down the current beats per minute. The one or more sensors can include at least one of a global positioning system (GPS) transceiver; a location determination device, an accelerometer sensor, a gyroscope, a compass, a heart-rate monitoring device, and a calorie-consumption monitoring device. Alternatively, the one or more sensors can include two or more of the options listed, such as for example an accelerometer and a heart rate monitor. The algorithm can include determining a distance traveled by the user over a measurement interval based on data from the one or more sensors, which can include an accelerometer sensor. The measurement interval can be sufficiently short to capture no more than a single step. The algorithm can also include incrementing a step counter if the distance traveled exceeds a threshold distance for classifying as the distance traveled as a step, and determining a target beats per minute to which the current audio content item should be modified or maintained based on a duration of user movement and the step counter for a current aggregation interval. The current aggregation interval can aggregate values from a plurality of measurement intervals including the measurement interval.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include computer hardware such as one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3 shows a table listing examples of threshold distance and maximum steps per minute scaling factors consistent with implementations of the current subject matter.

When practical, similar reference numbers denote similar structures, features, or elements.

DETAILED DESCRIPTION

Use of portable devices for playback of digital audio content has become increasingly common. In addition to dedicated devices, such as for example early generation versions of the iPod™ available from Apple Computer, Inc., cellular phones, smart phones, tablet computing devices, and the like are almost ubiquitous. Such devices, which are referred to herein as digital content playback devices, are generally capable of playing digital audio content that is stored on a data storage device (such as for example flash memory, a magnetic hard drive, optical media, etc.), which can optionally be internal to the digital content playback device 102. In addition, many currently available digital content playback devices of this type are also capable of streaming music over network connection from a server computer. Such a network connection can optionally include one or more of the Internet, a wide area wireless network (e.g. a cellular service network), a local area wireless network (e.g. a WiFi connection based on one or more 802.11 protocols), or other radio or optical communication links (e.g. Bluetooth, infrared, etc.). For the purposes of this disclosure, the term audio content item refers generally to a music file, other digital audio content, etc. that the digital content playback device 102 processes to produce audible playback of the included content to a user of the digital content playback device 102.

Figure 1:
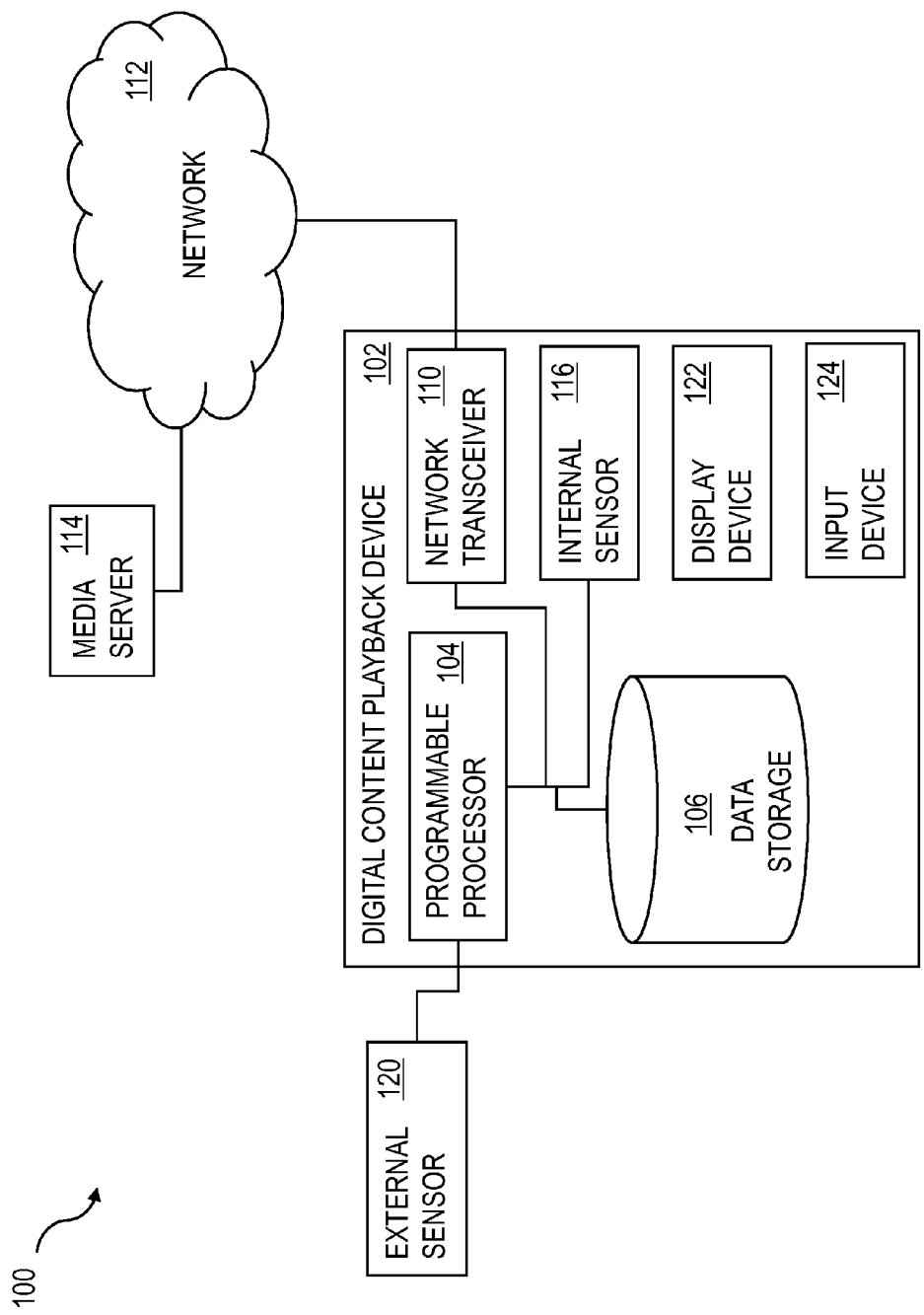
FIG. 1 shows a diagram illustrating aspects of a system showing features consistent with implementations of the current subject matter.

FIG. 1 shows a diagram 100 illustrating features that can be present in a system or systems capable of providing one or more features consistent with implementations of the current subject matter. A digital content playback device 102 can include at least one programmable processor 104 as well as at least one data storage device 106, which can include any kind of data storage device, including but not limited to those mentioned above. The digital content playback device 102 can also include at least one network transceiver 110 via which the digital content playback device 102 can communicate over a network 112 with a media server 114. The network 112 can include any of the options discussed above or their functional equivalents in any feasible combination, and the network transceiver 110 can include one or more of a WiFi transceiver, a cellular transceiver, or the like for sending and receiving data in communication with the media server 114 over the network 112.

The media server 112 can be implemented on one or more programmable machines that include one or more processors. In some examples, the media server 112 can include a "cloud" based music service. In other examples, the media server 112 can include a networked machine situated within a smaller-scale network, such as for example a home or commercial network. Consistent with other implementations of the current subject matter, audio content played by the digital content playback device 102 can be stored locally at the digital content playback device 102, for example in the data storage device 106 or other storage or memory internal to or associated with the digital content playback device 102. For example, a digital content playback device 102 having a hard drive, flash storage, random access memory, read-only memory, SD card, or the like that locally stores audio content can use that locally stored audio content for playback consistent with one or more of the approaches discussed herein.

The digital content playback device 102 can optionally include one or more internal sensors 116, and can in some implementations of the current subject matter receive input data from one or more externals sensors 120. The internal sensors and external sensors can include one or more of global positioning system (GPS) transceivers or other location determination devices, accelerometers, gyroscopes, compasses, heart-rate monitoring devices, calorie-consumption monitoring devices, or the like. In an example, internal sensors 116 can include a GPS transceiver, an accelerometer or accelerometer sensor, a gyroscope or gyroscopic sensor, and a compass, and external sensors 120 can include one or both of a heart rate sensor and a calorie consumption device. As used herein, an accelerometer sensor refers to a device that measures movement and gravity, as well as an angle of orientation. The internal sensors 116 can communicate with the programmable processor 104 over an internal communication bus of the digital content playback device 102 or via any feasible connections. External sensors 120 can communicate with the programmable processor 104 over a communication path than can include a Bluetooth connection, an infrared connection, an RFID connection, some other kind of wireless communication link, a wired connection, or the like. The term "sensors" is used throughout the reminder of this disclosure to refer interchangeably to internal sensors 116 and external sensors 120 unless a contrary usage is explicitly indicated. The programmable processor 104 can execute an audio content modification module or program (referred to herein as a decision making module or DMM), which can optionally be an "app," a web application (e.g. application software that runs in a web browser or is created in a browser-supported programming language, such as one or more of JavaScript, HTML, CSS, etc., and that relies on a common web browser to render the application), a native application (e.g. an application program that has been developed for use on a particular platform or device), or the like. The digital content playback device 102 can also include a display device (e.g. a screen) for displaying information to the user and one or more input devices (e.g. a touch screen, a stylus, one or more buttons or keys, a touch or mechanical keyboard, etc.) for receiving input from the user.

While a user is receiving (e.g. listening to playback of) an audio content item supplied by the digital content playback device 102 and using the DMM, the data received from the sensors ("sensor data") can be stored in the data storage device 106 and thereby retained on the digital content playback device 102 for later analysis. Optionally, the sensor data can be transmitted to a networked storage. In some examples, data transmitted to a networked storage is anonymized or alternatively stored in a secure manner to maintain privacy of the user. The stored sensor data can be stored at some storage or analysis interval that is useful for making determinations of actions to be taken in response to a physical or physiological state of the user, a level of activity of the user, etc. For example, a sensor data storage interval can optionally be one second, 5 seconds, 10 seconds, etc. When the sensor data are generated at a finer time interval than the storage or analysis interval, the data can be aggregated in some manner, for example by averaging over the longer storage or analysis interval, etc.

Periodically, the retained sensor data can be analyzed to estimate a current level of physical performance of the user and to determine if some change in the supplied audio content is indicated. While not an exhaustive list, examples of actions that can be taken to cause a change in the supplied audio content can include one or more of changing a number of beats per minute (BPM) of musical audio content being supplied, inserting a motivational additional audio track that overlays the currently supplied audio content item (e.g. a "voice-over" reading an inspirational or motivational statement, quotation, or the like), skipping to a higher or lower intensity part of a group of songs or within a continuous "mix" of songs, etc. A higher or lower intensity song or other audio content item can include a higher or lower beats per minute, or alternatively can meet other criteria or classifying features relating to higher of lower intensity, or more or less motivational, etc. Such criteria can be pre-defined (e.g. stored in a library or other database based on settings defined globally) for individual audio content items or groups of audio content items. Alternatively or in addition, criteria can be defined or modified for content items or groups of content items based on user input, which can be received via a user interface on the digital content playback device 102, via a web interface (e.g. using a browser on another device, such as a computer a tablet, etc. or on the digital content playback device 102 itself), or by any other approach.

Figure 2:
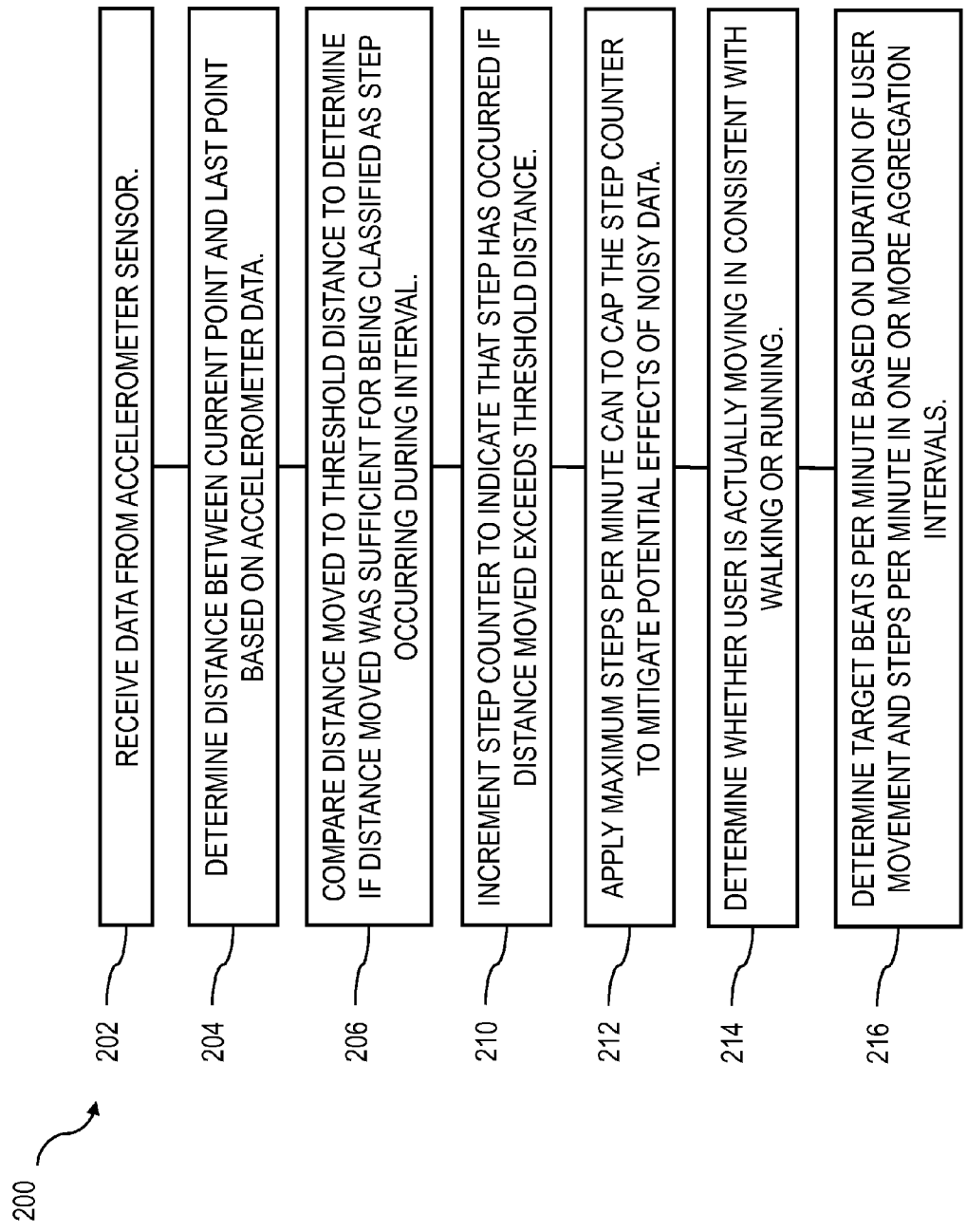
FIG. 2 shows a process flow diagram illustrating aspects of a method having one or more features consistent with implementations of the current subject matter.

The number of BPM of a currently playing audio content item can be dynamically changed, either by gradually increasing or decreasing the BPM within an audio content item (e.g. by "speeding it up" or "slowing it down"). Alternatively, the BPM can be changed by transitioning to a different song or track (e.g. a different audio content item) with a different BPM, etc. The change can (but is not required to) be gradual such that the BPM is not changed suddenly or too frequently, and only after it is determined that the user has altered his or her pace for a reasonable and configurable amount of time. The change in BPM is also advantageously completed neither too quickly nor too slowly, and is completed to as closely as possibly synchronize with intended actions of the user. Adjustments to the BPM of audio content being played for the user can be One measure of a running or walking user's pace, which can be used consistent with some implementations of the current subject matter, is a calculation of a number of steps per minute. This calculation can be based on data received from an accelerometer sensor, for example one that is internal to or otherwise in communication with the digital content playback device 102. FIG. 2 shows a process flow chart 200 illustrating features consistent with a representative (but non-limiting) approach to such a calculation. At 202 data are received from the accelerometer sensor for a measurement interval, which can optionally be fixed. The measurement interval can in one example be in a range of 5 to 50 milliseconds, or optionally approximately 10 milliseconds. In general, the measurement interval is chose to be sufficiently short such that no more than a single step can occur during the measurement interval. The receiving can optionally occur in response to a periodic querying (e.g. pinging or otherwise contacting) of the accelerometer sensor by a programmable processor 104 of the digital content playback device 102.

At 204, a distance between a current point and a last point is determined based on the accelerometer data. For example, the accelerometer sensor can return a distance moved over the measurement interval in 202. The distance moved is compared to a threshold distance at 206 to determine if the distance moved was sufficient for being classified as a step occurring during the measurement interval. The threshold distance can be a customizable, scalar setpoint that can be entered manually or determined by the digital content playback device 102 for a user of the digital content playback device 102. The comparing of the distance moved to the threshold distance can be accomplished in some examples by calculating the dot product of the distance moved vector with itself and comparing this dot product to a scalar threshold value. At 210, a step counter is incremented by one to indicate that a step has occurred if the distance moved exceeds the threshold distance. At 212, a maximum steps per minute can be applied to cap the value of the step counter to mitigate potential effects of noisy data. For example, the maximum value can be set at some number of steps per minute that no human could reasonably exceed.

To convert steps per minute into a target beats per minute value for the audio content playback, an additional calculation can be performed to determine at 214 whether the user is actually moving in a manner consistent with walking or running. In one example, two parallel tables (e.g. a primary table and a secondary table) can be created. Each of the parallel tables can track one or more of time intervals, the number of total steps taken since a start of data recording and a number of steps taken in a last defined aggregation interval (e.g. a 5 second aggregation interval or a defined time aggregation interval of another length). The primary and secondary tables can be used to enhance the user experience by ensuring that changes in the audio content playback is not improperly influenced by temporary stops in movement. In other words, by use of two tables, skewing of the beats per minute calculations as a result of pauses in movement (which can negatively impact the user experience) can be avoided.

If the number of steps taken in the most recent aggregation interval is below a cadence threshold, the secondary table does not increment. The cadence threshold can be defined as a minimum number of steps required to establish that the user is actually running or walking (e.g. resting, stopped at an intersection, performing other activities, etc.). If the number of steps taken in the most recent aggregation interval is at or above the cadence threshold, the secondary table is incremented. The first table increments for each aggregation interval. Because the second table only increments if the cadence threshold is exceeded, the first table is used for the current steps per minute unless the number of steps for the aggregation interval is below the cadence threshold. When that condition occurs, the previous, unincremented value in the second table is used as the current steps per minute.

At 216, a target beats per minute is determined based on a duration over which the user is determined to have been moving and the number of steps per minute in a current aggregation interval and/or at least one prior aggregation interval. In an illustrative but non-limiting example, if the time interval indicates the user has been moving for less than a minute, the target beats per minute is the number of steps taken in the interval multiplied by the duration of the time interval (in seconds) divided by 60 seconds in a minute. If the user has been moving for more than a minute, the target beats per minute is the number of total steps taken in the current aggregation interval subtracted from the number of total steps taken at a prior aggregation interval some period of time prior to the current interval (e.g. 60 seconds or 12 intervals prior for a 5 second interval). Both calculations can be bounded by upper and lower caps as defined by user input, by one or more predefined values (e.g. defined within the DMM app, etc.), or the like.

Values for the threshold distance and the maximum steps per minute can optionally be set initially based on the user's indication of where the digital content playback device 102 is held during exercise. For example, if the digital content playback device 102 is held in the user's pocket, the threshold distance can be in a range of approximately 0.68 to 0.72, or optionally approximately 0.70, and the maximum steps per minute can be in a range of approximately 3.2 to 3.4 or optionally approximately 3.3. If the digital content playback device 102 is held in the user's hand, the threshold distance can be in a range of approximately 0.76 to 0.80, or optionally approximately 0.78, and the maximum steps per minute can be in a range of approximately 3.4 to 3.6, or optionally approximately 3.5. If the digital content playback device 102 is secured on or otherwise attached to an armband worn by the user, the threshold distance can be in a range of approximately 0.84 to 0.88, or optionally approximately 0.86, and the maximum steps per minute can be in a range of approximately 3.4 to 3.6, or optionally approximately 3.5.

The threshold distance and the maximum steps per minute can optionally also or alternatively be abstracted into a "sensitivity" setting that is capable of altering these values using scaling factors, such as for example on a range of 1 to 10. The scaling factors to be used can be determined based on user input, some automated calibration process, or the like. For example, the DMM can direct the user of the digital content playback device 102 to take a prescribed number of steps or to perform some other set of movements and can measure accelerometer sensor responses as the user performs the directed activities. Based on the accelerometer sensor responses, appropriate scaling factors for the user can be determined. In an example of a scaling range of 1 to 10, FIG. 3 shows a table 300 listing possible scaling factors that can be used for the threshold distance and maximum steps per minute.

Using a collection of historical sensor data for the user and historical user responses to previous modifications in the supplied audio content that can be accumulated over multiple instances of physical activity while using features described herein, response parameters for how the supplied audio content is changed in response to sensor data can be adapted to provide improved motivational value relative to the historical impact of such changes on the user's actions. For example, a default parameter for changing the BPM of the supplied audio content can be to cause a 5% increase in BPM if the user is detected to have fallen off of a target pace by 5%. However, if the historical sensor data and historical user responses to previous modifications in the supplied audio content so indicate, a greater or smaller change in the BPM can be supplied. In this manner, the DMM can not only make changes in the supplied audio content to improve the motivational value of the supplied audio content but can also "learn" the types and magnitude of such changes that can provide the greatest motivational value for a given user. In addition to being able to learn by analyzing changes in the supplied audio content and the effects of such changes on user performance, the DMM can also receive direct user input via the user input device 124. For example, the user can indicate that a given song or group of songs was motivational or that an executed change in the BPM or other modification of the supplied audio content was helpful or not (or more or less helpful based on some scale), etc. Historical data can also be used in conjunction with a specific song or mix or playlist of songs. For example, if there is a history of one or more BPM increases or decreases or perceived user actions or received user inputs for a specific song or mix or playlist of songs, a pattern recognition module can identify similar sensor data in a later use of the digital content playback device 102 and can seek to duplicate the one or more actions.

Changes to the BPM can optionally be as a percentage of the current BPM or as some absolute increase or decrease, and can be continuous or stepwise. Similarly, the DMM can include functionality for requesting that a user input one or more goals for a physical activity session (e.g. via the display device 122 and input device 124) and can use these goals as inputs for deciding how to modify the supplied audio content. For example, if the user goal is to run a half marathon in less than 2 hours, a projected desired pace can be determined, and the BPM can be changed or other actions taken to modify the supplied audio content if the sensor data indicate that the user is moving too fast or too slow relative to the desired pace. Using additional sensor data, such as for example GPS data in conjunction with mapping data, accelerometer data, heart rate data, etc. the modifications to the supplied audio content can be further refined to account for a current user situation. For example, if the user is currently climbing a hill and dropping below the target pace (optionally by some tolerance amount) the BPM can be increased to provide additional motivation. However, if the heart rate data indicates that the user may be laboring (e.g. an excessively high heart rate), the BPM can be slowed to better reflect the current possible pace.

Supplied audio content can be catalogued according to one or more factors or rankings reflecting a motivational value of the content or an intensity value of the content. The rankings or cataloguing can reflect one or more of results from sensor data relative to user outcomes (e.g. by aggregating anonymized data from multiple users, possibly at a central server receiving such data from a number of digital content playback devices 102 used by different users), based on user input (e.g. "please rank this content on a scale), based on one or more measurable aspects of the content (e.g. motivational lyrics, musical features such as building to a crescendo, etc.), or the like.

Figure 4:
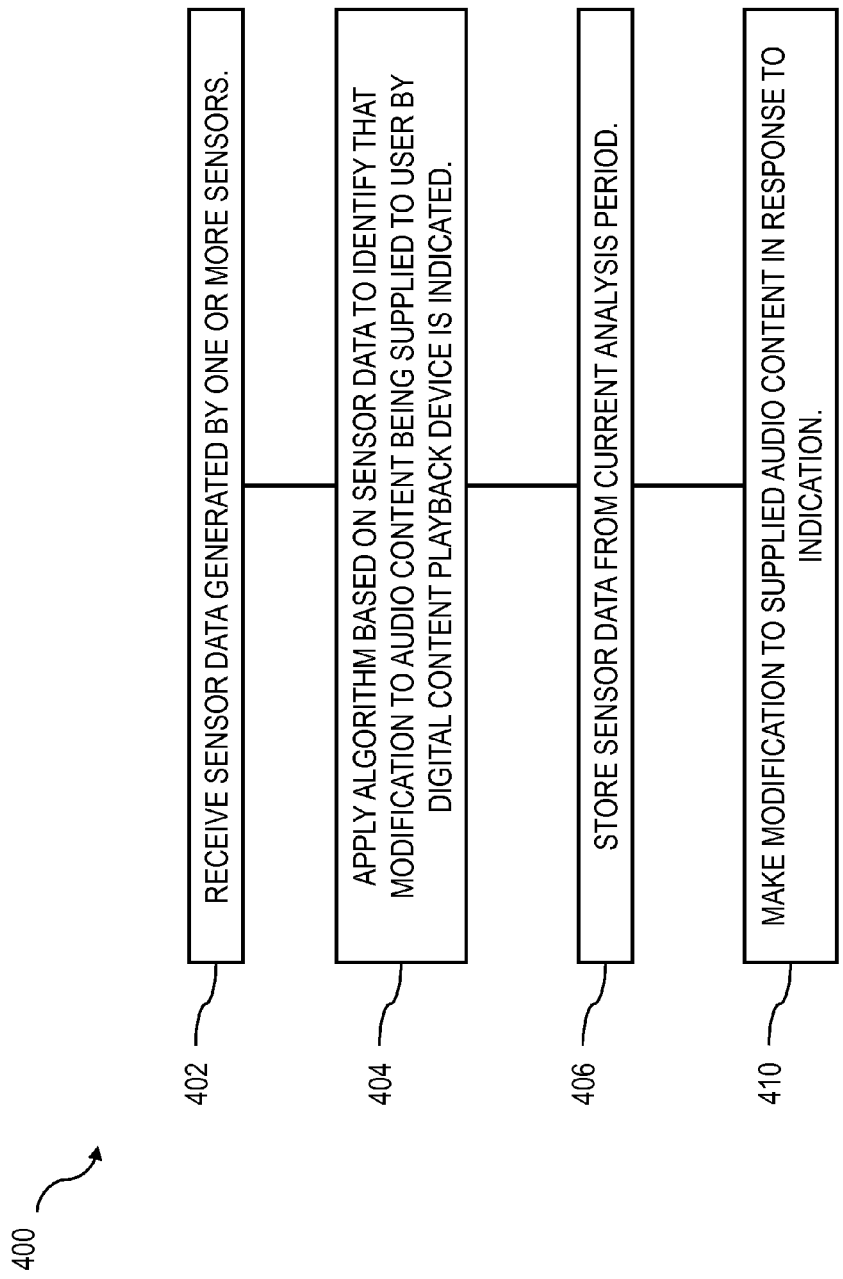
FIG. 4 shows a process flow diagram illustrating aspects of a method having one or more features consistent with implementations of the current subject matter.

FIG. 4 shows a process flow chart 400 illustrating features of a method consistent with an implementation of the current subject matter. One or more of these features can be included in other implementations. At 402, sensor data generated by one or more sensors is received by a programmable processor 104. In an advantageous implementation, the programmable processor 104 is part of a digital content playback device 102, such as for example a smart phone, etc. Alternatively, the programmable processor can be part of a server or other remote computer that receives the sensor data over a network.

The sensor data can be representative of one or more of a location, a speed, an angle of incline etc. of the digital content playback device 102, and by extension, of a user of the digital content playback device 102. In addition or alternatively, the sensor data can be representative of one or more physiological parameters (e.g. a heart rate, a calorie burn rate, a blood pressure, a body temperature, a brain activity level, etc.) of the user. At 404, an algorithm is applied based on sensor data from at least a current analysis period to identify that a modification to audio content being supplied to the user by the digital content playback device 102 is indicated. As discussed above, the modification can be indicated for a variety of reasons, which can generically be referred to as factors indicative of a current level of performance of a physical activity by the user that is outside of a preferred set of parameters. At 406, the sensor data from the current analysis period can also be stored on a data storage device 106, which can be included on the digital content playback device 102 or accessed over a network. At 410, the modification is made to the supplied audio content in response to the indication. The modification can include one or more factors as discussed above.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

Further to the description above, to provide for interaction with a user, one or more aspects or features of the subject matter described herein can be implemented on a computing device (e.g. a digital content playback device 102) having a display device 122, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the digital content playback device 102. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Possible input devices 124 include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together."

Use of the term "based on," above and in the claims is intended to mean, "based at least in part on," such that an unrecited feature or element is also permissible.

The scope of the following claims may include other implementations or embodiments.

What is claimed is:
1. A method comprising:
receiving sensor data generated by one or more sensors, the sensor data relating to a user of a digital content playback device;
identifying that a modification to a current audio content item being supplied to the user by the digital content playback device is indicated; the identifying comprising applying an algorithm based on the sensor data; and
making the modification to the current audio content item, wherein the algorithm comprises:
determining a distance traveled by the user over a measurement interval based on data from the one or more sensors, the measurement interval being sufficiently short to capture no more than a single step;
incrementing a step counter if the distance traveled exceeds a threshold distance for classifying as the distance traveled as a step; and
determining a target beats per minute to which the current audio content item should be modified or maintained based on a duration of user movement and the step counter for a current aggregation interval, the current aggregation interval aggregating values from a plurality of measurement intervals including the measurement interval.

2. A method as in claim 1, wherein the modification comprises changing from the current audio content item to a different audio content item, the different audio content item having a different intensity criteria than the current audio content item.

3. A method as in claim 2, wherein the different intensity criteria comprises at least one of a different beats per minute, a different intensity level, and a different motivational level.

4. A method as in claim 1, wherein the modification comprises:
continuing to play the current audio content item; and
changing from a current beats per minute of the current audio content item to a different beats per minute by speeding up or slowing down the current beats per minute.

5. A method as in claim 1, wherein the one or more sensors comprise at least one of a global positioning system (GPS) transceiver; a location determination device, an accelerometer sensor, a gyroscope, a compass, a heart-rate monitoring device, and a calorie-consumption monitoring device.

6. A method as in claim 1, wherein the one or more sensor comprise two or more of a global positioning system (GPS) transceiver; a location determination device, an accelerometer sensor, a gyroscope, a compass, a heart-rate monitoring device, and a calorie-consumption monitoring device, and wherein the algorithm uses as inputs data received from the two or more sensors.

7. A system comprising:
one or more sensors generating sensor data relating to a user of a digital content playback device; and
computer hardware configured to perform operations comprising:
identifying that a modification to a current audio content item being supplied to the user by the digital content playback device is indicated; the identifying comprising applying an algorithm based on data from the one or more sensors; and
making the modification to the current audio content item, wherein the algorithm comprises:
determining a distance traveled by the user over a measurement interval based on data from the one or more sensors, the measurement interval being sufficiently short to capture no more than a single step;
incrementing a step counter if the distance traveled exceeds a threshold distance for classifying as the distance traveled as a step; and
determining a target beats per minute to which the current audio content item should be modified or maintained based on a duration of user movement and the step counter for a current aggregation interval, the current aggregation interval aggregating values from a plurality of measurement intervals including the measurement interval.

8. A system as in claim 7, wherein the modification comprises changing from the current audio content item to a different audio content item, the different audio content item having a different intensity criteria than the current audio content item.

9. A system as in claim 8, wherein the different intensity criteria comprises at least one of a different beats per minute, a different intensity level, and a different motivational level.

10. A system as in claim 7, wherein the modification comprises:
continuing to play the current audio content item; and
changing from a current beats per minute of the current audio content item to a different beats per minute by speeding up or slowing down the current beats per minute.

11. A system as in claim 7, wherein the one or more sensors comprise at least one of a global positioning system (GPS) transceiver; a location determination device, an accelerometer sensor, a gyroscope, a compass, a heart-rate monitoring device, and a calorie-consumption monitoring device.

12. A system as in claim 11, wherein the computer hardware receives additional sensor data from at least one additional sensor and the algorithm is applied also based on the additional sensor data.

13. A computer program product comprising a non-transitory machine-readable storage medium storing instructions that, when executed by at least one programmable processor, cause the at least one programmable processor to perform operations comprising:
receiving sensor data generated by one or more sensors, the sensor data relating to a user of a digital content playback device;
identifying that a modification to a current audio content item being supplied to the user by the digital content playback device is indicated; the identifying comprising applying an algorithm based on the sensor data; and
making the modification to the current audio content item, wherein the algorithm comprises:
determining a distance traveled by the user over a measurement interval based on data from the one or more sensors, the measurement interval being sufficiently short to capture no more than a single step;
incrementing a step counter if the distance traveled exceeds a threshold distance for classifying as the distance traveled as a step; and
determining a target beats per minute to which the current audio content item should be modified or maintained based on a duration of user movement and the step counter for a current aggregation interval, the current aggregation interval aggregating values from a plurality of measurement intervals including the measurement interval.

14. A computer program product as in claim 13, wherein the modification comprises changing from the current audio content item to a different audio content item, the different audio content item having a different intensity criteria than the current audio content item.

15. A computer program product as in claim 14, wherein the different intensity criteria comprises at least one of a different beats per minute, a different intensity level, and a different motivational level.

16. A computer program product as in claim 13, wherein the modification comprises:
continuing to play the current audio content item; and
changing from a current beats per minute of the current audio content item to a different beats per minute by speeding up or slowing down the current beats per minute.

17. A computer program product as in claim 13, wherein the one or more sensors comprise at least one of a global positioning system (GPS) transceiver; a location determination device, an accelerometer sensor, a gyroscope, a compass, a heart-rate monitoring device, and a calorie-consumption monitoring device.

18. A method as in claim 1, wherein the one or more sensors comprise an accelerometer sensor.

19. A system as in claim 7, wherein the one or more sensors comprise an accelerometer sensor.

20. A computer program product as in claim 13, wherein the one or more sensors comprise an accelerometer sensor.

\* \* \* \* \*